(No Model.)

D. A. REED.
WHIFFLETREE COUPLING.

No. 333,335. Patented Dec. 29, 1885.

WITNESSES:
Norris A. Clark.
H. R. McKenna

INVENTOR:
David A. Reed
by H. S. Snow & Co
attys.

United States Patent Office.

DAVID A. REED, OF SHELBY, MICHIGAN.

WHIFFLETREE-COUPLING.

SPECIFICATION forming part of Letters Patent No. 333,335, dated December 29, 1885.

Application filed August 6, 1885. Serial No. 173,759. (No model.)

*To all whom it may concern:*

Be it known that I, DAVID A. REED, a citizen of the United States, residing at Shelby, in the county of Oceana and State of Michigan, have invented certain new and useful Improvements in Fastenings for Whiffletrees, of which the following is a specification, reference being had therein to the accompanying drawings.

My invention relates to a device for making connection between a fixed and a pivoted part, or two pivoted parts; and it consists of two plates united by means of a loose rivet or bolt, so that they can turn upon each other, each provided with bolts or standards for securing it to the part to which it is to be attached.

My invention is peculiarly adapted to whiffletrees for all sorts of vehicles, and it saves the usual clip around the whiffletree, which cuts and pulls out the hairs of the horse's tail; but it may also be applied to all points and parts where a pivot is required, as upon pump-handles and all permanent levers of this sort; also upon vehicles in lieu of the usual king-bolt—one part of the device being applied to the bolster or equivalent part and the other to the axle—and it will thereby dispense with the use of the ordinary fifth-wheel. It can also be used on all sorts of machinery where whiffletrees are employed. It possesses the advantage of having an exceedingly short pivot pin or bolt, which conduces to the strength of the device and renders bending or breaking very rare and almost impossible, as it is known that a pin or bolt of very short length will stand an equal or greater strain than one of greater length and twice the diameter.

The following description and claim will define my invention.

The accompanying drawings illustrate a means for carrying my invention into practice as applied to whiffletrees.

Figure 1:
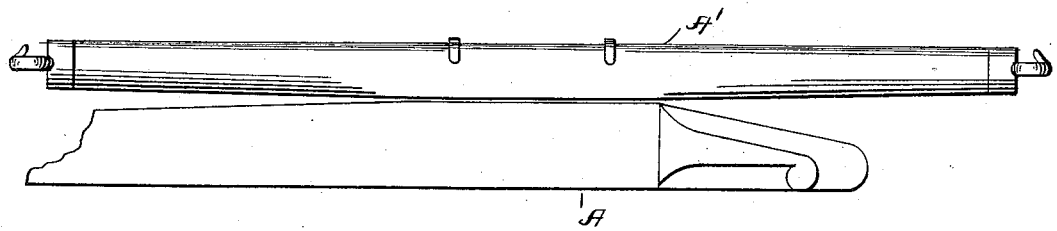
Figure 2:
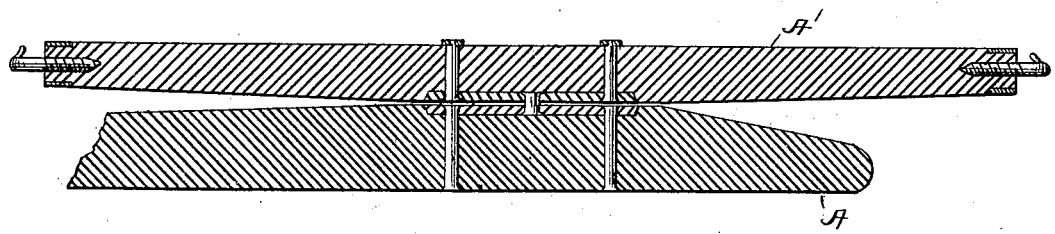
Figure 3:
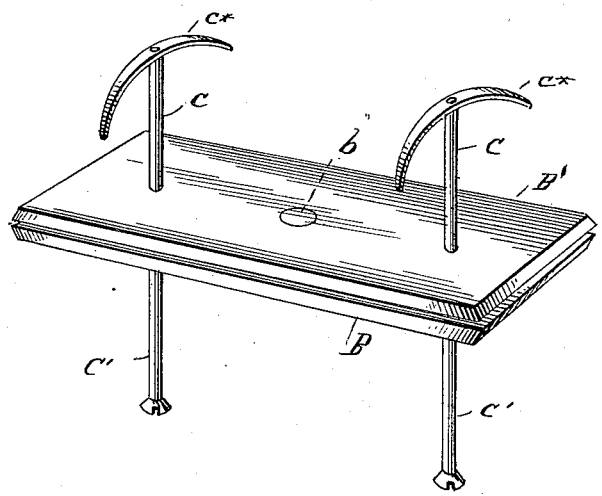

Figure 1 is a front elevation of a whiffletree applied to the end of a stretcher or double-tree. Fig. 2 is a longitudinal vertical section of the same. Fig. 3 is an enlarged perspective view of my invention detached from the other parts.

Similar letters of reference indicate corresponding parts in all the figures where they occur.

A is one end of a double-tree. A' is the whiffletree, secured thereto by means of the device which forms the subject-matter of this application for patent. This device consists, essentially, of the plates B and B' and the connecting pivot or bolt $b$. Each of the plates is free to turn upon the bolt $b$, and this said bolt is of just sufficient length to go through both plates and be properly headed. By preference, I countersink the holes through the plates and head the ends of the bolt in such countersinks; but it will be understood that the heads may be outside of the plates, and provision made for them in the wood of the whiffletree or other part.

It will be understood that the plates B B' may be of any size or shape desired and convenient to fit the parts to which they are to be applied, as the requirements of the situation may demand. I have shown them long and narrow, to fit a whiffletree.

In the former part of this specification I have enumerated various situations in which my device may with profit be employed, and it will be understood that the plates are to be of a shape such as to most perfectly fill the requirements of each.

For convenience of attachment to the parts upon which they are to be placed, I provide the plates with bolts or rivets C C and C' C'. These rivets pass through the part and are suitably headed, to insure engagement and security. As shown in the drawings, the upper rivets, C C, have long curved heads $c^* c^*$, for passing over the whiffletree and partially down its sides, for insuring against splitting when the draft is applied. The lower ones, C' C', are swaged or flattened in the usual way for rivets, and may be supplied with a plate or separate head, to insure their retention. As shown, both upper and lower bolts are headed in countersinks in the face of the plates B B'.

It will be understood that the number and form of these fastening means C C C' C' may be varied as convenience and need dictate. The central pivot or bolt, $b$, will usually bear about the relative proportion to the plates as shown; but it will be understood, also, that this may be changed as required.

Having thus described my invention, what I desire to claim and secure by Letters Patent is—

In combination with a whiffletree and that part of the vehicle to which it is attached, the plates B B', secured to the whiffletree and that part on which the whiffletree bears, and having plane wearing-surfaces, the said plates being provided with holes and countersinks, as described, and the pin $b$, having its ends riveted and extended only to the outer face of the plates, substantially as and for the purposes described.

In testimony whereof I affix my signature in presence of two witnesses.

DAVID A. REED.

Witnesses:
CHAS. F. SHIRTS,
M. E. WEBBER.